United States Patent
Cui et al.

(10) Patent No.: US 10,281,603 B2
(45) Date of Patent: May 7, 2019

(54) METHOD, APPARATUS AND DEVICE OF FRACTURE AVO INVERSION FOR FRACTURED MEDIUM

(71) Applicants: BEIJING IVY TECHNOLOGY CO. LTD., Beijing (CN); CHINA UNIVERSITY OF MINING AND TECHNOLOGY (BEIJING), Beijing (CN)

(72) Inventors: Xiaoqin Cui, Calgary (CA); Suping Peng, Beijing (CN); Wenfeng Du, Beijing (CN)

(73) Assignees: BEIJING IVY TECHNOLOGY CO. LTD., Beijing (CN); CHINA UNIVERSITY OF MINING AND TECHNOLOGY (BEIJING), Beijing (CN)

( * ) Notice: Subject to any disclaimer, the term of this patent is extended or adjusted under 35 U.S.C. 154(b) by 49 days.

(21) Appl. No.: 15/246,664

(22) Filed: Aug. 25, 2016

(65) Prior Publication Data
US 2017/0059728 A1    Mar. 2, 2017

(30) Foreign Application Priority Data
Aug. 25, 2015   (CN) .......................... 2015 1 0526779

(51) Int. Cl.
*G01V 1/30*      (2006.01)

(52) U.S. Cl.
CPC ................ *G01V 1/307* (2013.01); *G01V 1/30* (2013.01); *G01V 2210/632* (2013.01); *G01V 2210/646* (2013.01)

(58) Field of Classification Search
CPC ............. G01V 1/307; G01V 2210/632; G01V 2210/63; G01V 1/30; G01V 2210/646
See application file for complete search history.

(56) References Cited

U.S. PATENT DOCUMENTS

| 6,985,404 B2 * | 1/2006 | Mallick ..................... G01V 1/30 367/47 |
| 9,316,757 B2 * | 4/2016 | Bansal ..................... E21B 49/00 |
| 2005/0090986 A1 * | 4/2005 | Van Riel .................. G01V 1/30 702/6 |
| 2007/0260404 A1 * | 11/2007 | Dong ....................... G01V 1/32 702/16 |

(Continued)

OTHER PUBLICATIONS

Steven R. Rutherford, Amplitude-versus-offset variations in gas sands, 1989, Geophysics, vol. 54 No. 6 pp. 680-688.*

(Continued)

*Primary Examiner* — Mischita L Henson
(74) *Attorney, Agent, or Firm* — Gokalp Bayramoglu (57) ABSTRACT

The present disclosure discloses a fracture AVO inversion method for a fractured medium, wherein, said method includes: acquiring seismic data from the fractured medium; obtaining a reflection coefficient of the fractured medium, by an AVO inversion for the seismic data based on a newly-built equation. The present disclosure also provides a fracture AVO inversion apparatus and device for a fractured medium. The present invention can flexibly and accurately obtain properties of a fractured medium with impedance contrast (rock properties of the host media plus properties of thee fracture).

12 Claims, 6 Drawing Sheets

(56) References Cited

U.S. PATENT DOCUMENTS

2015/0293245 A1* 10/2015 Mesdag ............... G01V 1/282
703/2

OTHER PUBLICATIONS

Unknown, AVO Theory, Sep. 2004, Hampson-Russell Software Services Ltd., pp. 1-84.*
Gary Mavko, The Rock Physics of AVO, no date, Stanford Rock Physics Laboratory, pp. 302-326.*
Brian Russell, Making sense of all that AVO and inversion stuff!, Apr. 2010, Hampson-Russell, pp. 1-57.*
Bakulin et al., Estimation of fracture parameters from reflection seismic data—Part I: HTI model due to a single fracture set, 2000, Society of Exploration Geophysicists, vol. 65, No. 6, pp. 1788-1802.*
Xiaoqin Cui et al., "Seismic Forward Modeling of Fractures and Fractured Medium Inversion", 2018, Springer Geophysics, pp. 1-153, ISBN 978-981-10-3574-5.*
Carl Jorg Petersen, Seismic Characterization of Marine Gas Hydrates and Free Gas At Northern Hydrate Ridge, Cascadia Margin, 2004, Dissertation, pp. 1-109.*
Ye Zheng et al., Factors Affecting AVO Analysis of Prestack Migrated Gathers, May 27-30, 2002, EAGE 64th Conference & Exhibition, pp. 1-4.*

* cited by examiner

METHOD, APPARATUS AND DEVICE OF FRACTURE AVO INVERSION FOR FRACTURED MEDIUM

TECHNICAL FIELD

The present disclosure relates to a seismic exploration technology, specifically to a method, an apparatus and a device of fracture AVO inversion for a fractured medium data.

BACKGROUND

Amplitude Versus Offset (AVO) inversion attempts to use an amplitude variation with offset from available surface seismic data to estimate a density as well as reflection coefficients of a P-wave velocity and/or a S-wave-velocity of an earth-model. AVO results are used to infer a lithology and a fluid property of a reservoir, which is an ultimate goal for hydrocarbon exploration. A fact is that AVO inversion directly associates subsurface rock properties with surface seismic data with a limitation imposed by amplitude variation with offset. Therefore, the AVO inversion is an effective technique and is widely used to study reservoir characterizations. For example, it can be used in oil, gas, coalbed methane, coal field mining and mineral explorations.

A basis of the AVO theory is derived from the Zoeppritz equation (1919) that describes relationships between an incident angle of a plane wave and reflection and transmission coefficients of compressional waves (P-waves) and shear waves (S-waves) at an impedance contrast interface (where there are velocity and density contrasts) in a perfectly welded media. Many studies have derived useful AVO equations for meeting practical requirements by approximating original Zoeppritz equations. Rueger (2002) and Downton et al. (2011) provided diverse forms of approximate AVO equations to predict fractured rock properties that are dependent on the effective anisotropic medium theory. In 2002, Chaisri provided some exact formulas (which are complicated) for reflection and transmission coefficients for non-welded contact boundary conditions, but did not provide any AVO approximate formula.

There is a viewpoint that the fractures are also reflection generators for reflecting waves propagating in the media (Schoenberg, 1980; Cui, lines and krebes, 2013). Consequently, recorded surface seismic data would inevitably contain fracture reflections when an acquisition reservoir contains fractures. This would cause an error in the prediction of rock properties of the host media when an inversion processing is applied with a conventional AVO equation. The reason is that the conventional AVO equation is based on an assumption of perfectly welded contact, but they considered the fractured medium as an effective anisotropic medium. In other words, the conventional AVO equation does not entirely treat the fracture reflections apart from the input seismic data when they attempt to invert rock properties of the host media for a fractured medium with impedance contrast.

SUMMARY

Accordingly, the present disclosure provides a fracture AVO inversion method, apparatus and device for a fractured medium exploration, which use a new fracture AVO equation to invert seismic data of a fractured medium so as to obtain reflection coefficients of related host rocks and fractures, and remove fracture reflections from seismic data to obtain accurate reflection coefficients of host medium properties.

The present disclosure provides a fracture AVO inversion method for an exploration of a fractured medium, wherein, said method includes: acquiring seismic data from the fractured medium; obtaining reflection coefficients of the fractured medium, by an AVO inversion for the seismic data based on a newly-built equation.

The present disclosure also provides a fracture AVO inversion apparatus for an exploration of a fractured medium, wherein, the apparatus includes: a data acquisition module, for acquiring seismic data from the fractured medium; an inversion processing module, for obtaining reflection coefficients of the fractured medium, by an AVO inversion for the seismic data based on a newly-built equation.

The present disclosure also provides a fracture AVO inversion device for a fractured medium exploration, wherein, the device includes: a data acquisition means, for acquiring seismic data from the fractured medium; a data preprocessing means, for making a true-amplitude processing and a pre-stack migration processing for the seismic data, and then sorting the seismic data into a CDP gather; and an inversion processing means for obtaining reflection coefficients of the fractured medium, by an AVO inversion for the seismic data based on a newly-built equation.

The present disclosure provides embodiments which establish a new fracture AVO equation of a fractured medium data, wherein the reflection coefficient consist of a welded contact interface portion (i.e. a conventional impedance difference portion) and a non-welded contact interface (i.e. a fracture portion). This new fracture AVO equation is used to invert seismic data of the fractured medium to obtain reflection coefficients of a host medium and the fracture. This new fracture AVO equation is also used to invert seismic data of the fractured medium to obtain accurate the reflection coefficients of the fractures, and the fractures distributions in the reservoir, when the host medium has no impedance contrast. This new fracture AVO equation is also used to invert seismic data of the fractured medium to obtain accurate rock properties when the fracture compliances are vanishing, so as to invert an accurate elastic reflection coefficients without any influence from the fracture.

DETAILED DESCRIPTION OF INVENTION

Hereinafter, technical solutions of the present disclosures are described in details by referring to several figures and some embodiments.

An original Zoeppritz equation (Zoeppritz, 1919) describes a relationship between an incident angle of a plane P-wave and reflection and transmission coefficients of compressional waves (P-waves) and shear waves (S-waves) at an interface in a perfectly welded contact medium. This relationship is a basis of AVO and AVAZ (amplitude variation with angle and azimuth) methods which assume that the amplitudes contain the media contrast information. In an exploration, an AVO inversion method is widely used to estimate elastic reflection coefficients of a rock (e.g. P wave, S wave, density and reflection coefficient), and then derive more parameters describing reservoir characteristics. The AVO equation is based on an assumption that a welded boundary condition will bring an inversion error to a fractured medium with non-welded boundary conditions. So a method is needed, which is applicable for both a media-contact with a welded boundary condition and a media-contact with a non-welded boundary condition.

In an embodiment of the present disclosure, considering a fracture problem in the AVO equation of the fractured medium, some equations are established for describing a relationship between an incident angle of a plane wave and reflection and transmission coefficients of PP wave and PS wave. These equations can be transformed into the original Zoeppritz equation with a welded media assumption, into an equation only for describing reflection and transmission coefficients of the fracture feature with a non-welded contact assumption, as well as into an equation for describing reflection and transmission coefficients of a fractured medium with a non-welded media assumption. Thus new fracture AVO equations adapt to describe subsurface geobodies with two types of boundaries as above-mentioned. Also the influence of fracture can be eliminated when the equations are used to obtain elastic reflection coefficients of a host rock from input data of a fractured medium.

Specifically, a new AVO equation established according to an embodiment of the present disclosure is provided as follows:

$$R_p(\theta) \approx \frac{i\omega S_T}{1 - i\omega v_x S_T} T^T(\theta) + i\omega S_N N^N(\theta) + $$
$$\left( A(\theta) + \frac{i\omega S_T}{1 - i\omega v_x S_T} A_\alpha^T(\theta) + i\omega S_N A_\alpha^N(\theta) \right) r_\alpha + $$
$$\left( B(\theta) + \frac{i\omega S_T}{1 - i\omega v_x S_T} B_\beta^T(\theta) + i\omega S_N B_\beta^N(\theta) \right) r_\beta + $$
$$\left( C(\theta) + \frac{i\omega S_T}{1 - i\omega v_x S_T} C_\rho^T(\theta) + i\omega S_N C_\rho^N(\theta) \right) r_\rho,$$

where $$T^T(\theta) = 2\frac{1}{\rho}\mu^2 q_\alpha P^2, \; N^N(\theta) = \frac{1}{2}\rho\alpha\sec\theta - \frac{2\mu}{q_\alpha}P^2, \; A(\theta) = \frac{1}{2\cos^2\theta},$$

$$A_\alpha^T(\theta) = \frac{\mu}{q_\beta}P^2 - \frac{1}{4}\rho\beta\sec\vartheta\sec\theta^2, \; A_\alpha^N(\theta) = -(\mu^2\frac{q_\beta}{\rho}(1+\sin\theta^2)P^2,$$

$$B(\theta) = -4\left(\frac{\beta}{\alpha}\right)^2\sin^2\theta, \; B_\beta^T(\theta) = 2\frac{\mu}{q_\beta}P^2, \; B_\beta^N(\theta) = 4\mu^2\frac{q_\beta}{\rho}P^2,$$

$$C(\theta) = \frac{1}{2}\left(1 - 4\left(\frac{\beta}{\alpha}\right)^2\sin^2\theta\right), \; C_\rho^T(\theta) = \frac{\mu}{q_\beta}P^2 - \frac{1}{4}\rho\beta\sec\vartheta,$$

$$C_\rho^N(\theta) = 2\mu^2\frac{q_\beta}{\rho}P^2,$$

where $$\theta = \frac{\theta_1 + \theta_2}{2}, \; \vartheta = \frac{\vartheta_1 + \vartheta_2}{2}, \; \alpha = \frac{\alpha_1 + \alpha_2}{2}, \; \beta = \frac{\beta_1 + \beta_2}{2},$$

$$\rho = \frac{\rho_1 + \rho_2}{2},$$

$$\Delta\alpha = \alpha_2 - \alpha_1, \; \Delta\beta = \beta_2 - \beta_1, \; \Delta\rho = \rho_2 - \rho_1$$

$$r_\alpha = \frac{\Delta\alpha}{\alpha}, \; r_\beta = \frac{\Delta\beta}{\beta}, \; r_\rho = \frac{\Delta\rho}{\rho},$$

$$q_{\alpha_{1,2}} = \frac{\cos\theta_{1,2}}{\alpha_{1,2}}, \; q_\alpha = \frac{q_{\alpha 1} + q_{\alpha 2}}{2},$$

$$q_{\beta_{1,2}} = \frac{\cos\vartheta_{1,2}}{\beta_{1,2}}, \; q_\beta = \frac{q_{\beta 1} + q_{\beta 2}}{2},$$

$$\mu = \rho\beta^2,$$

where $v_x$ is a viscosity of a fluid in the fracture, $S_T$ and $S_N$ are a shear compliance and a normal compliance of the fracture respectively, $\theta_1$ and $\theta_2$ are an incidence angle and a transmission angle respectively, $\vartheta_1$ and $\vartheta_2$ are a converted wave reflection angle and a converted wave transmission angle respectively, $\alpha_{1,2}$, $\beta_{1,2}$ and $\rho_{1,2}$ are a P-wave velocity, a S-wave velocity and a density representing rock properties respectively, wherein subscripts 1 and 2 denote an upper media and a lower media respectively, $r_\alpha$, $r_\beta$ and $r_\rho$ are reflection coefficients of the P-wave velocity, the S-wave velocity and the density respectively, w is an angular frequency, and p is a ray parameter.

Figure 1:
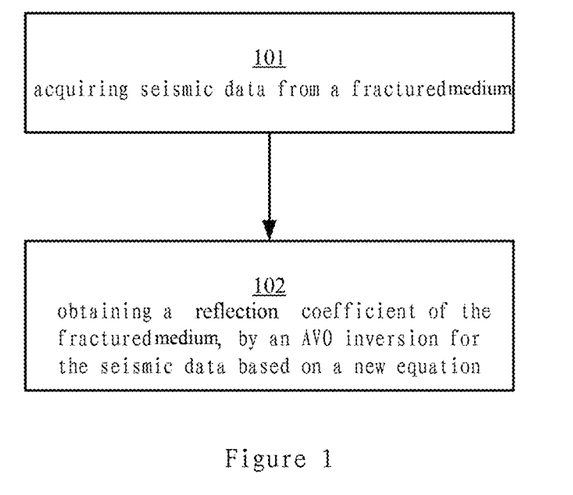
FIG. 1 shows a flow chart of a fracture AVO inversion method according to an embodiment of the present disclosure.

When the above equation is applied, please refer to FIG. 1. It is necessary to obtain seismic data of fracture medium before this equation is used for AVO inversion. For example, an actual amplitude preserving processing and pre-stack migration processing should be taken on real seismic data, then seismic data are sorted into CDP gather as input data known in the above AVO equation. And then least-square methods or other nonlinear algorithms are used to solve a new fracture AVO equation (this will be described hereinafter in detail), so that elastic reflection coefficients $R_p(\theta)$ and some related fracture parameters will be obtained exactly.

Hereinafter, a derivation process of the new AVO equation in fractured medium will be described.

I. AVO Equation in Fractured Medium.

Figure 2:
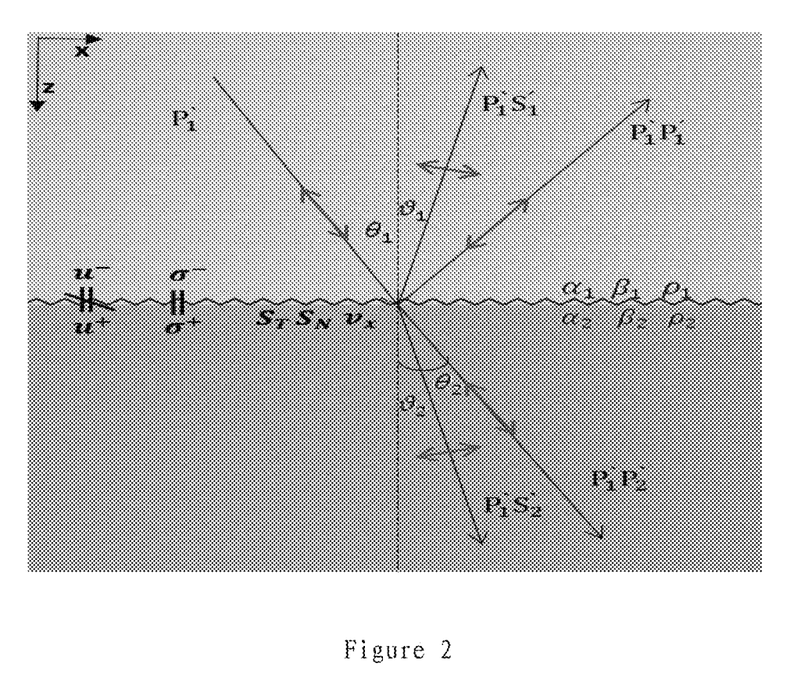
FIG. 2 shows a diagram of reflection and transmission rays when an incident P wave arrives at a horizontally fracture interface according to an embodiment of the present disclosure.

1. Exact reflection coefficients equation for a viscous material-infilled vertically fractured medium FIG. 2 shows a diagram of reflection transmission rays when an incident P wave arrives at a horizontally fracture interface, wherein single arrows indicate propagation directions of waves, and double arrows indicate polarization directions of waves. A vertical x-z domain shows an incident P-wave ($P_1'$), a reflected P-wave ($P_1'P_1'$), a transmitted P-wave ($P_1'P_2'$) and converted S-waves ($P_1'S_1'$ and $P_1'S_2'$), as well as an incident angle ($\theta_1$), a transmission angle ($\theta_2$), a converted reflection angle ($\vartheta_1$), a converted transmission angle ($\vartheta_2$) and a horizontally fracture interface. The rock properties of the upper isotropic media and the lower isotropic media include P-wave velocity ($\alpha_{1,2}$), S-wave velocity ($\beta_{1,2}$) and density ($\rho_{1,2}$). A normal compliance ($S_N$) and a tangential compliance ($S_T$) of fracture and infilled viscous material $v_x$ are also provided in FIG. 2.

In a model of viscous material-infilled fractured HTI medium with impedance contrast, a vertical fracture with haled viscous material is embedded into the host media. A harmonic wave is used to represent an incident plane P-wave $asp_s = Ae^{iw(s \cdot x - t)}d$, wherein A is an amplitude and assumed to be unity. $s \cdot x = s_x + s_y + s_z$ represents a slowness of a harmonic plane wave in a travelling direction. "d" represents a wave polarization that is not unity in an anisotropic media. Consequently, the polarizes of PP PS-waves in x and z-direction are defined as $dx_{\theta n}, d_{z\theta n}, d_{x\vartheta n}$ and $d_{z\vartheta n}$, respectively. n=1,2 indicates the upper media and the lower media respectively. For a given frequency $\omega$, a relationship between the PP-waves ($P_1'P_1'$, $P_1'P_2'$), the PS-waves ($P_1'S_1'$, $P_1'S_2'$), the angles ($\theta_{1,2}, \vartheta_{1,2}$) and the fracture parameters $S_T$ and $S_N$ at interface satisfies a linear slip non-welded contact boundary condition.

$$u^+ - u^- = S\sigma^+ \quad (1.00a)$$

$$\sigma^+ = \sigma^- \quad (1.00b)$$

where $$u = \begin{Bmatrix} u_x \\ u_z \end{Bmatrix}, \sigma = \begin{Bmatrix} \sigma_{xz} \\ \sigma_{zz} \end{Bmatrix}.$$

$$S = \begin{Bmatrix} S_T \\ S_N \end{Bmatrix}$$

will be replaced by $$\frac{S_T}{1 - i\omega v_x S_T}$$

to express a linear slip boundary condition, which contains the propagations of all seismic wave on a boundary.

$$\begin{bmatrix} d_{l\theta 1}\sin\theta_1 \\ d_{m\theta 1}\cos\theta_1 \\ (\overline{xx})_1\cos\theta_1 \\ (\overline{yy})_1\alpha_1 \end{bmatrix} = \begin{bmatrix} -d_{l\theta 1}\alpha_1 P & -d_{m\theta 1}\cos\vartheta_1 & d_{l\theta 2}\alpha_2 P - i\omega S_T(\overline{xx})_2\cos\theta_2 & d_{m\theta 2}\cos\vartheta_2 - i\omega S_T(\overline{rr})_2\beta_2 \\ d_{m\theta 1}\cos\theta_1 & -d_{l\theta 1}\beta_1 P & d_{m\theta 2}\cos\theta_2 - i\omega S_N(\overline{yy})_2\alpha_2 & -d_{l\vartheta 2}\beta_2 P + i\omega S_N(\overline{kk})_2\cos\vartheta_2 \\ (\overline{xx})_1\cos\theta_1 & (\overline{rr})_1\beta_1 & (\overline{xx})_2\cos\theta_w & (\overline{rr})_2\beta_2 \\ -(\overline{yy})_1\alpha_1 & (\overline{kk})_1\cos\vartheta_1 & (\overline{yy})_2\alpha_2 & -(\overline{kk})_2\cos\vartheta_2 \end{bmatrix} \begin{bmatrix} P_1'P_1' \\ P_1'S_1' \\ P_1'P_2' \\ P_1'S_2' \end{bmatrix} \quad (1.01)$$

where $i = \sqrt{-1}$, $f = \dfrac{\alpha^2}{\alpha^2 - \beta^2}$.

$$\begin{pmatrix} d_{l\theta n}\sin\theta_n \\ d_{m\theta n}\cos\theta_n \\ d_{m\vartheta n}\cos\vartheta_n \\ d_{l\vartheta n}\sin\vartheta_n \end{pmatrix} = \begin{pmatrix} \overline{l}_{\theta n,\varphi}\sin\theta_n\cos\varphi \\ \overline{m}_{\theta n,\varphi}\cos\theta_n \\ \overline{m}_{\vartheta n,\varphi}\cos\vartheta_n \\ \overline{l}_{\vartheta n,\varphi}\sin\vartheta_n\cos\varphi \end{pmatrix} = \begin{pmatrix} d_{x\theta n} \\ d_{z\theta n} \\ d_{x\vartheta n} \\ d_{z\vartheta n} \end{pmatrix} = d \quad (1.02)$$

where $\overline{l}_{\theta n,\varphi} = 1 + f(1 - \sin^2\theta_n \cos^2\varphi)(\delta_n^v + 2(\varepsilon_n^v - \delta_n^v)\sin^2\theta_n \cos^2\varphi)$ $\overline{m}_{\theta n,\varphi} = 1 - f(\sin^2\theta_n \cos^2\varphi)(\delta_n^v + 2(\varepsilon_n^v - \delta_n^v)\sin^2\theta_n \cos^2\varphi)$ $\overline{m}_{\vartheta n,\varphi} = 1 + f(\sin^2\vartheta_n \cos^2\varphi)(\delta_n^v + 2(\varepsilon_n^v - \delta_n^v)\sin^2\vartheta_n \cos^2\varphi)$ $(\overline{xx})_n = (d_{l\theta n} + d_{m\theta n})\rho_n \beta_n^2 P$ $(\overline{rr})_n = \rho_n(d_{l\theta n} - (d_{l\theta n} + d_{m\theta n})\beta_n^2 P^2)$ $(\overline{yy})_n = \rho_n[(d_{l\theta n} - d_{m\theta n})\alpha_n^2 P^2 + (d_{m\theta n} - d_{l\theta n} 2\beta_n^2 P^2)]$ $(\overline{kk})_n = \rho_n P[(2\beta_n^2 - \alpha_n^2)d_{m\vartheta n} + \alpha_n^2 d_{l\vartheta n}]$ In general, the source-receiver line is not always limited within an isotropic plane ($\varphi = 90°$). Instead, it disseminates any arbitrary plane with different azimuthal angles $\varphi$ with respect to the x-axis. The wave polarizations will vary with the change of the azimuthal angle and present an azimuthal anisotropic characteristics (HTI) (Rueger, 2001). $\varepsilon_n^v$ and $\delta_n^v$ in the above formula are anisotropic parameters of the HTI medium, if anisotropic parameters were determined by other fractures in the host rock, which could be obtained by transferring vertical fracture parameters $\Delta_N$, $\Delta_T$.

$$\varepsilon^v \approx -2g(1-g)\Delta_N \quad (1.03a)$$

$$\delta^v \approx -2g((1-2g)(\Delta_N + \Delta_T)) \quad (1.03b)$$

Figure 3:
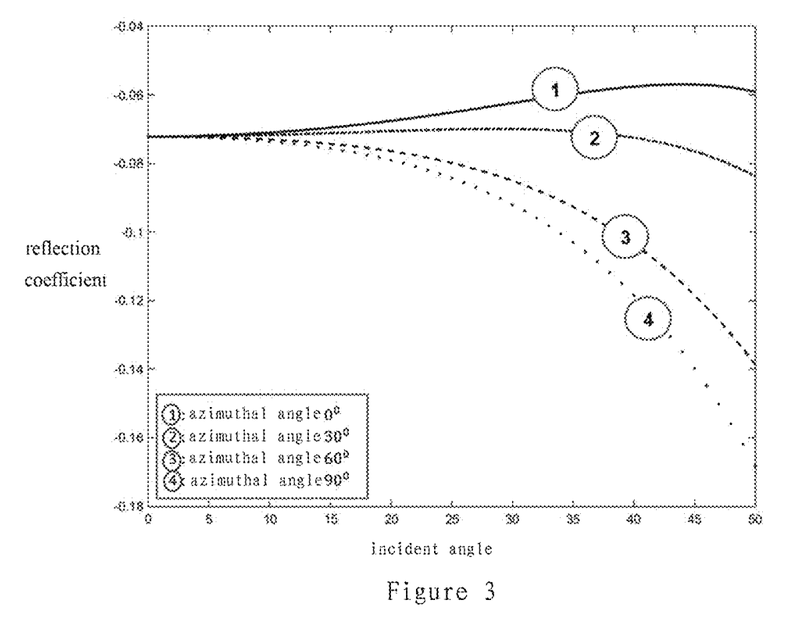
FIG. 3 shows reflection coefficients of dry vertical fractured medium (HTI) in different azimuths according to an embodiment of the present disclosure.

Inputting equation (1.02) and (1.03) into equation (1.01) obtains reflection coefficients with different azimuths for vertically fractured HTI media FIG. 3 shows reflection coefficients of a dry vertical fractured medium at different azimuths, the four reflection coefficient curves in FIG. 3 from top to bottom represent the conditions when the azimuths are $\varphi = 0°$, $\varphi = 30°$, $\varphi = 60°$, $\varphi = 90°$.

FIG. 3 indicates an AVAZ characteristic that the reflection coefficients vary with different incident angles and azimuthal angles for a fractured HTI medium. Different azimuthal angles lead to different slopes of reflection coefficients curves. It indicates that a fracture orientation plays an important role in a fractured HTI media. Under the circumstance of $\varphi=0°$, $d_{t\theta n}=1$, $d_{m\theta n}=1$, $d_{t\theta n}=1$ and $d_{m\theta n}=1$, the equation (1.01) will be modified as an equation for a fractured VTI medium formed from a horizontally fracture embedded into an isotropic host media. Additionally, if the fracture parameters are set as $S_T=S_N=0$, the equation (1.01) can be transformed into an equation which describes reflection coefficients for a layered VTI media with assumption of a perfectly welded contact medium.

Hereinafter, an approximate fracture AVO equation of horizontally fractured medium with fluid containing would be introduced.

A matrix at the left side of equation (1.01) represents an incident wave, and the right side of the equation represents a scattered wave, a reflection coefficient and a transmission coefficient. The equation can be rewritten as:

$$M[P_1'P_1'P_1'S_1'P_1'P_2'P_1'S_2']^T = N \quad (1.04)$$

The equation (1.04) is a PP wave reflection coefficient equation. When $\varphi=0°$ $d_{x\theta n}=d_{z\theta n}=d_{x\theta n}=d_{z\theta n}=1$, the linear algebraic equation (1.04) is easy to be solved. Therefore, an accurate PP wave reflection coefficients formula of fractured VTI medium with infilled viscous material is:

$$P_1'P_1' = R_w(\theta) | R_{non_w}(\theta) \quad (1.05)$$
$$= R_w(\theta) + \left(\frac{i\omega S_T}{1 - i\omega v_x S_T}\right) R_{non\_w}^T(\theta) + (i\omega S_N) R_{non\_w}^N(\theta)$$

The PP reflection coefficients in the equation (1.05) contains two items. The reflection coefficient $R_w$ is caused by velocity or density contrasts of the host medium that satisfies the assumption of perfectly welded contact media. The reflection coefficient $R_{non\_w}$ results from the fracture that the displacement discontinuity across the fracture generates reflections. In the equation (1.05), the upper subscripts T, N represent the reflectivity coefficients caused by the fracture, and correspond to the fracture of the tangential parameter $S_T$ and the normal compliance parameter $S_N$. For the conventional reflection coefficients $R_w$, it assumes that all incident and transmission angles are actual angles and less than 90°, and it is approximated with the same approximation way as Aki and Richards's AVO equation.

$$R_w(\theta) \approx \frac{1}{2\cos^2\theta} r_\alpha - 4\left(\frac{\beta}{\alpha}\right)^2 \sin^2\theta r_\beta + \frac{1}{2}\left(1 - 4\left(\frac{\beta}{\alpha}\right)^2 \sin^2\theta\right) r_\rho. \quad (1.06a)$$

For a fracture portion $R_{non\_w}$, it can be simplified in the tangential and the normal components with the same approximation way as that of $R_w$. Thus equations are obtained:

$$R_{non_w}^T(\theta) \approx 2\frac{1}{\rho}\mu^2 q_\alpha P^2 + \left(\frac{\mu}{q_\beta}P^2 - \frac{1}{4}\rho\beta\sec\vartheta\sec\theta^2\right) r_\alpha + \quad (1.06b)$$
$$2\frac{\mu}{q_\beta}P^2 r_\beta + \left(\frac{\mu}{q_\beta}P^2 - \frac{1}{4}\rho\beta\sec\vartheta\right) r_\rho,$$

$$R_{non_w}^N(\theta) \approx \frac{1}{2}\rho\alpha\sec\theta - \frac{2\mu}{q_\alpha}P^2 - \quad (1.06c)$$
$$\left(\mu^2\frac{q_\beta}{\rho}(1+\sin\theta^2)P^2\right) r_\alpha + \left(4\mu^2\frac{q_\beta}{\rho}P^2\right) r_\beta + \left(2\mu^2\frac{q_\beta}{\rho}P^2\right) r_\rho,$$

where $r_\alpha$, $r_\beta$ and $r_\rho$ are a compressional velocity, a shear velocity and a density reflection coefficient, respectively, and p is a ray parameter, and $$\theta = \frac{\theta_1 + \theta_2}{2}, \vartheta = \frac{\vartheta_1 + \vartheta_2}{2}, \alpha = \frac{\alpha_1 + \alpha_2}{2}, \beta = \frac{\beta_1 + \beta_2}{2}, \quad (1.07)$$
$$\rho = \frac{\rho_1 + \rho_2}{2},$$
$$\Delta\alpha = \alpha_2 - \alpha_1, \Delta\beta = \beta_2 - \beta_1, \Delta\rho = \rho_2 - \rho_1,$$
$$q_{\alpha_{1,2}} = \frac{\cos\theta_{1,2}}{\alpha_{1,2}}, q_\alpha = \frac{q_{\alpha_1} + q_{\alpha_2}}{2},$$
$$q_{\beta_{1,2}} = \frac{\cos\vartheta_{1,2}}{\beta_{1,2}}, q_\beta = \frac{q_{\beta_1} + q_{\beta_2}}{2},$$
$$\mu = \rho\beta^2,$$

$R_{non\_w}^T(\theta)$ and $R_{non\_w}^N(\theta)$ have the same style as $R_w$ with respect to terms $r_\alpha$, $r_\beta$ and $r_\rho$. Thus equation (1.04) can be rewritten as:

$$R_p(\theta) \approx R_w(\theta) + \frac{i\omega S_T}{1 - i\omega v_x S_T} R_{non\_w}^T(\theta) + i\omega S_N R_{non\_w}^N(\theta) \approx \quad (1.08)$$
$$\frac{i\omega S_T}{1 - i\omega v_x S_T} T^T(\theta) + i\omega S_N N^N(\theta) +$$
$$\left(A(\theta) + \frac{i\omega S_T}{1 - i\omega v_x S_T} A_\alpha^T(\theta) + i\omega S_N A_\alpha^N(\theta)\right) r_\alpha +$$
$$\left(B(\theta) + \frac{i\omega S_T}{1 - i\omega v_x S_T} B_\beta^T(\theta) i\omega S_N B_\beta^N(\theta)\right) r_\beta +$$
$$\left(C(\theta) + \frac{i\omega S_T}{1 - i\omega v_x S_T} C_\rho^T(\theta) + i\omega S_N C_\rho^N(\theta)\right) r_\rho$$

This is a new approximated AVO equation for a fractured medium with an infilled viscous material that divides the reflection coefficients into fracture reflection coefficients for the fracture and impedance contrast reflection coefficients for the host media.

When the fracture is a dry fracture, $v_x=0$, the equation (1.08) is changed as:

$$R_p(\theta) \approx R_w(\theta) + i\omega S_T R_{non\_w}^T(\theta) + i\omega S_N R_{non\_w}^R$$
$$(\theta) \approx \omega S_T T^T(\theta) + i\omega S^N N^N(\theta) + (A(\theta) + i\omega S^T A_\alpha^T$$
$$(\theta) + i\omega S_N A_\alpha^N(\theta)) r_\alpha + (B(\theta) + i\omega S_T B_\beta^T(\theta) + i\omega S_N B_\beta^N$$
$$(\theta)) r_\beta + (C(\theta) + i\omega S_T C_\rho^T(\theta) + i\omega S_N C_\rho^N(\theta)) r_\rho. \quad (1.09)$$

Figure 4:
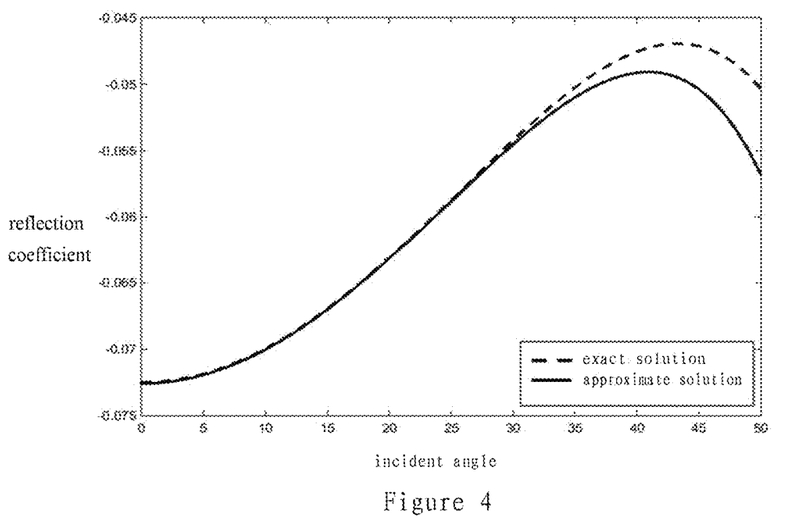
FIG. 4 shows a comparison between an exact solution and an approximate solution of PP wave reflection coefficients in a dry horizontally fractured medium according to an embodiment of the present disclosure.

FIG. 4 shows a comparison between an exact solution and an approximate solution of the PP-wave reflection coefficients for a dry fractured medium. The dashed line represents the exact solution from equation (1.04) at $v_x=0$, while the solid line is for the approximate solution from equation (1.09). FIG. 4 proves that the solution of the new approximated AVO equation (1.09) for the fractured medium closely reaches the exact solution (equation 1.04. $v_x=0$) within a range of incident angles is less than 40°, that is, the approximate solution is very precise within the range of conventional incident angles.

For equations (1.08 and 1.09), when a fracture reflection in the input data are removed, the rock properties of the fractured medium (i.e. host media) can be correctly inverted from the input data.

If $r_\alpha = r_\beta = r_\rho = 0$ is set with respect to equations (1.08 and 1.09), then $$R_p(\theta) \approx \left( \frac{i\omega S_T}{1 - i\omega v_x S_T} T^T(\theta) + i\omega S_N N^N(\theta) \right). \quad (1.10a)$$

$$R_p(\theta) \approx (i\omega S_T T^T(\theta) + i\omega S_N N^N(\theta)). \quad (1.10b)$$

The equation (1.10) clearly expresses that the fracture parameters can be predicted from seismic data when the fractures are embedded into a unique medium without impedance contrast. This can be an approach to verify well-known parameters from an initial model.

If $S_T = S_N = 0$ is set with respect to equations (1.08 and 1.09), then $$R_p(\theta) \approx A(\theta) r_\alpha + B(\theta) r_\beta + C(\theta) r_\rho. \quad (1.11)$$

The equation (1.11) expresses that the new fracture AVO equations can be transformed into conventional AVO equations to estimate a rock elastic reflectivity caused only by impedance contrast without fracture issues in a medium. The conventional AVO equations based on assumption of the welded boundary conditions cause an inversion error to a fractured medium with nonwelded contact boundary conditions. But a method provided by the embodiments of the present disclosure not only works for data from medium with welded boundary conditions but also adapts to data from medium with nonwelded boundary conditions. An equation expression (referring to the equations 1.01) of a relationship of incident angles of a plane wave with reflection and transmission coefficients of the PP and PS-waves has been derived. The equations (1.01) are based on nonwelded boundary conditions and take azimuth parameters into account. The equations (1.01) have a pattern similar to that of original Zoeppritz equations, but they take the fracture as nonwelded contact interface. Also, these equations can be transformed into original Zoeppritz equations with welded media assumption, and into equations only for reflection and transmission coefficients of the fracture with nonwelded contact assumption, as well as into equations for reflection and transmission coefficients of the fractured medium with the nonwelded media assumption. Thus the new equations adapt to describe subsurface geo-bodies with two discussed boundaries.

The fractured medium is equal to a fracture plus a host medium (Schoenberg and Muri, 1889). Similarly, a reflection of the fractured medium is approximately equal to the reflection of the fracture plus the reflection of the host medium. Therefore, the reflection of the fracture is independent and can be estimated from seismic data. Further the reflection of the host medium can be obtained by subtracting the reflection of the fracture from the reflection of the fractured medium, so as to correctly invert rock properties of the host medium. So, the embodiments of the present disclosure build up a new AVO equation, wherein welded portions work for reflection coefficients generated by an interface with impedance contrast, and nonwelded portions work for reflection coefficient of a fracture. The new AVO equation can be transformed into other equations with certain assumptions. For example, the new AVO equation may be simplified as a conventional AVO equation when fracture parameters vanish $S_T = 0$, $S_N = 0$. Or the new AVO equation may be simplified as a fracture AVO equation, when elastic reflection of the host medium is equal to zero ($r_\alpha = r_\beta = r_\rho = 0$). Thus, an appropriate inversion of elastic reflection coefficients of the host medium for a fractured medium should employ the new fracture AVO equation because they provide a way to remove the fracture reflection coefficients from the seismic data. In other words, the input data for inversion should not be contaminated by the fracture reflections when we attempt to invert elastic properties for the host medium. Similarly, the parameters of the tangential and normal compliances of the fracture can be determined from seismic data of fracture medium by the fracture AVO equation (1.10).

Synthetic seismic data from a fractured medium have been used to invert rock properties of a host media by applying new and conventional AVO equations respectively. It indicates that the inversion results of the new AVO equation theoretically and experimentally are more accurate than the results obtained from the conventional AVO equation. The inverting result difference, obtained by calculating these two AVO methods, indicates that compared to a longitudinal wave, a transverse wave is more sensitive to a fracture. Therefore, it can be concluded that the new AVO equation should be used to estimate rock properties of a host media for the fractured medium, so that we can correctly delineate a reservoir within fractures.

Hereinafter, a realization of AVO inversion to dry fractured medium will be introduced.

Obtaining geologic parameters corresponding to velocity reflectivity and density reflectivity is an ultimate objective of the AVO method.

Figure 5:
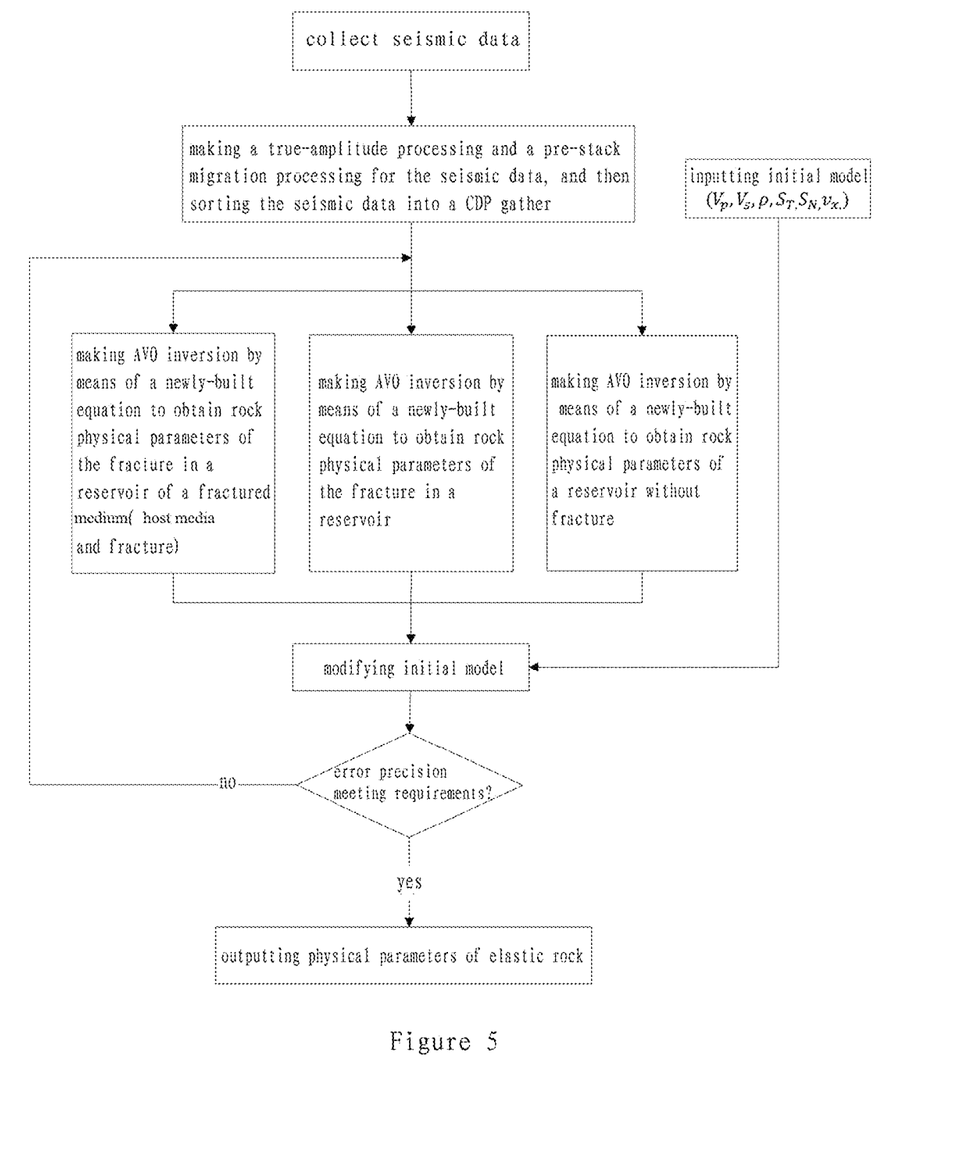
FIG. 5 shows a flow chart of a new fracture AVO equation regarding actual seismic data according to an embodiment of the present disclosure.

The equation (1.11) may be modified with respect to a generalized linear inversion (GLI) problem when $S_T = 0$, $S_N = 0$.

$$Gm = d, \quad (1.12)$$

where "G" is a linear operator depending on a geometry, and "m" represents unknown elastic reflectivity parameters of $r_\alpha$, $r_\beta$ and $r_\rho$. "d" is seismic data received. The equation (1.11) can be used to solve all of eight unknown elastic reflection parameters of mediums with fracture and without fracture. FIG. 5 is a flow chart of AVO inversion to gain the rock parameters by applying equations of the present disclosure. The process includes acquisition of seismic data of a fractured medium, true amplitude protection processing and pre-stack migration, and sorting to CDP gathers. Then appropriate AVO equation and parameters are selected to inverse rock parameters.

In particular, for a fractured medium with infilled viscous fluid $v_x \neq 0$, the inversion uses equation (1.08) to obtain rock parameters of the fractured medium (host media and fracture). For a dry fractured medium $v_x = 0$, the inversion uses equation (1.09) to obtain rock parameters of the fractured medium (host media and fracture).

For the fracture embedded into a unique isotropic medium, the inversion uses the equation (1.10 a, b) to obtain fracture parameters of the fractured medium.

For the isotropic medium with the impedance contrast and without fractures, the inversion uses the equation (1.11) to obtain rock parameters of the fractured medium.

Then, the initial model ($V_p$, $V_s$, $\rho$, $S_T$, $S_N$, $v_x$), is modified according to rock parameters until an error precision meets respective requirements, and then final rock parameters are output.

A particular embodiment is illustrated below which is designed according to a geological fractured medium model.

1. Numerical Application

Figure 6:
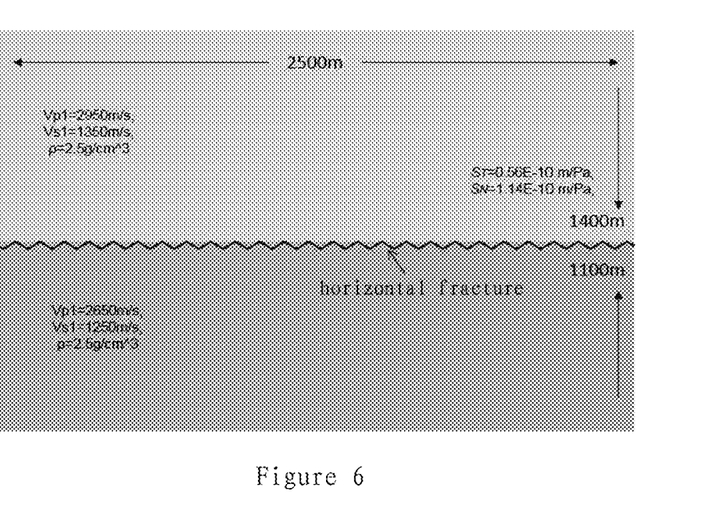
FIG. 6 shows an AVO inversion model of a horizontally fractured medium according to an embodiment of the present disclosure.

FIG. 6 shows an AVO inversion model of a horizontally fractured medium according to one embodiment of the present disclosure. This model focuses on a VTI fractured medium, wherein a horizontally fracture is embedded into a host isotropic media. The synthetic seismic record of the fracture model offers the input data which is applied to AVO inversion of VTI fractured medium.

2. Data Preprocessing

A fractured medium is a linear summation of a fracture and a host media. This relationship approximately fits the reflectivity of a CDP gather, i.e. reflections of the fractured medium≈reflections of the fracture+reflections of the host media. In other words, the reflection coefficients of pre-stack data of a fractured medium can be divided into two parts: a reflection coefficients of the fracture and a reflection coefficients of a host media. Therefore, during the numerical research, the reflection coefficients generated by a fracture should be simulated and removed from the input seismic data, in order to truly invert an elastic reflections for a host media. As a numerical study, the reflections caused by a fracture should be calculated and subtracted from input seismic data. For real data, an integrated method is usually used to the fracture initial model, and the fracture parameters can be calculated from well logs.

3. Analysis of Results

Figure 7:
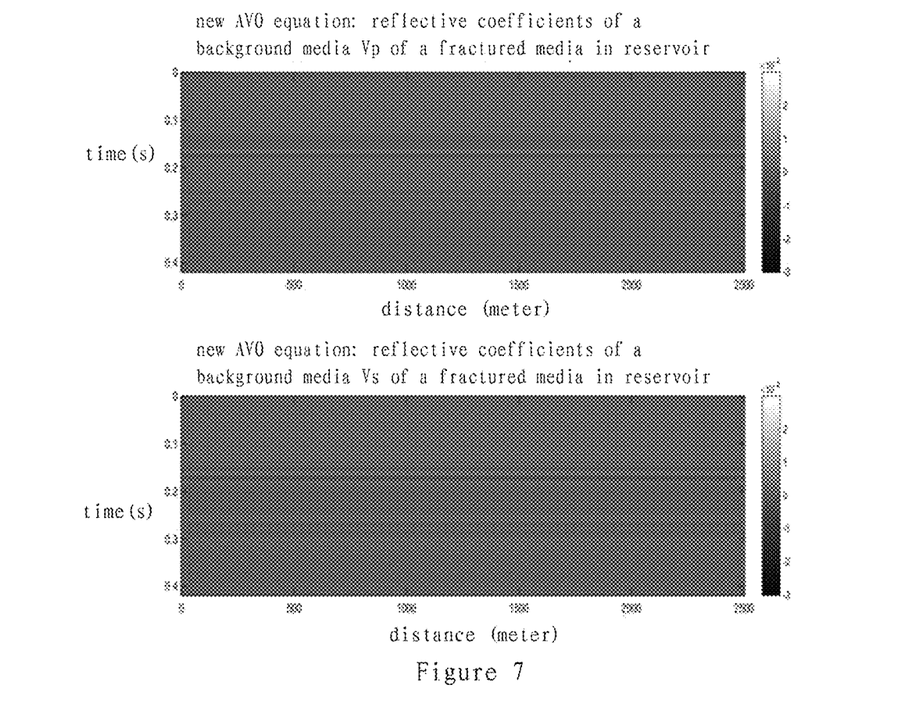
FIG. 7 shows results of a new AVO equation inversion for the horizontal fractured medium according to an embodiment of the present disclosure.
Figure 8:
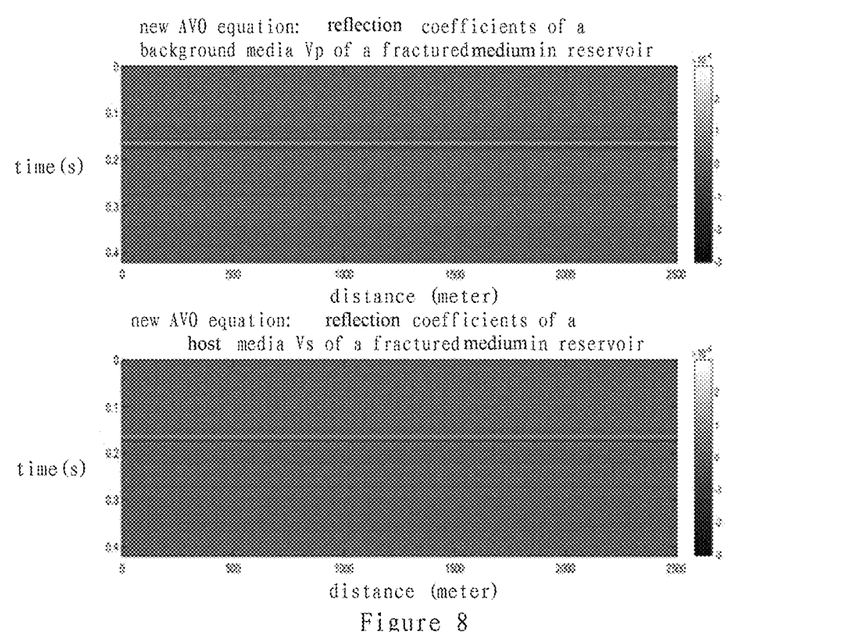
FIG. 8 shows results of a conventional AVO equation inversion for horizontal fractured medium.
Figure 9:
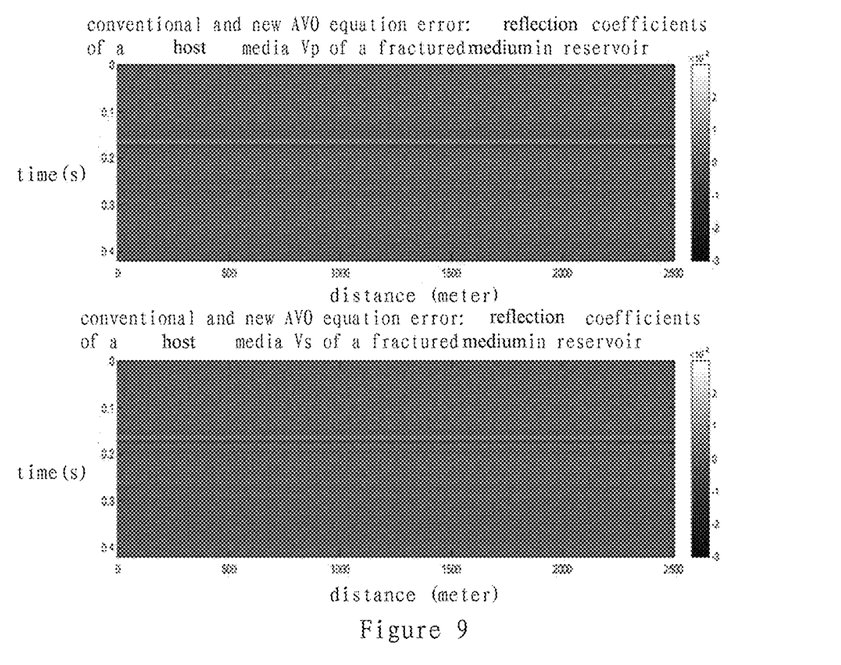
FIG. 9 shows errors of a new and conventional fracture AVO equation inversion results for a horizontally fractured medium.

FIG. 7 shows AVO inversion results, wherein reflection coefficients of a P-wave and a S-wave of a host media of a fractured medium are interpreted based on the new practical AVO equation and a generalized inversion algorithm. In addition, the fracture reflections have been removed from the input seismic data. In FIG. 7, the interface at 0.1656 s accurately represents the interface of the host medium. FIG. 8 also shows AVO inversion results, which, however, were obtained using the conventional AVO equation. Using the same scale, FIGS. 7 and 8 show different inversion results of the same fractured medium. FIG. 9 shows the difference between the inversion results obtained by the above two methods.

Figure 10:
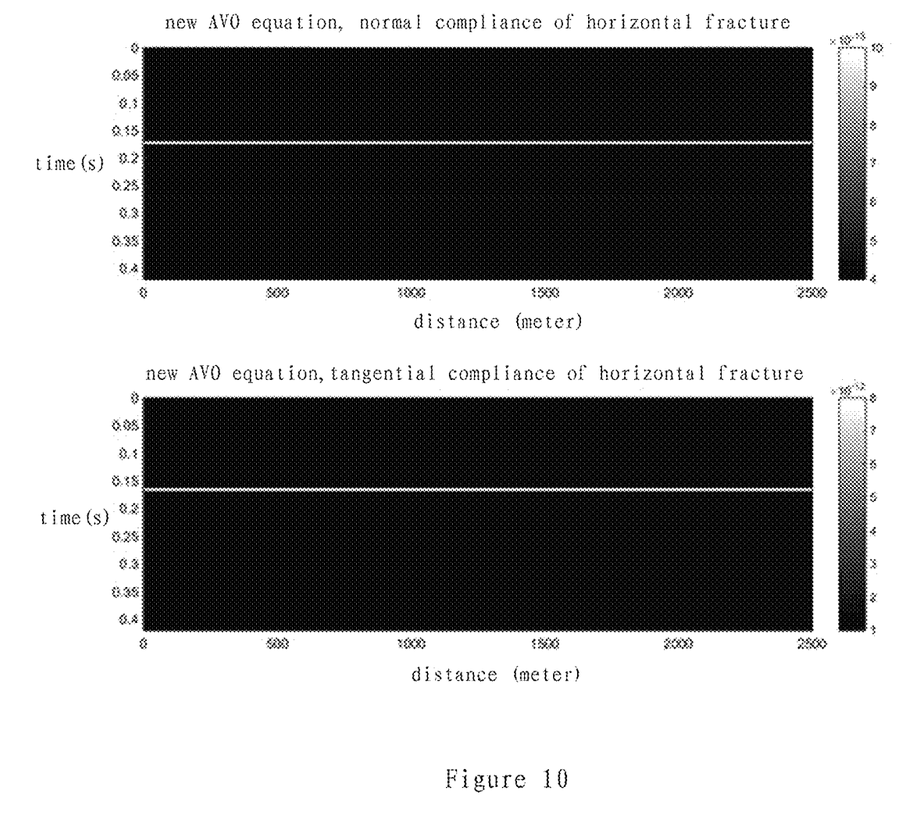
FIG. 10 shows a tangential compliance and a normal compliance of the new AVO equation inversion results for horizontally fractured medium according to an embodiment of the present disclosure.

FIG. 10 shows inverted normal and tangential fracture compliances by using the equation (1.14). The input seismic data are generated only by the fracture because the host medium is an isotropic media without impedance. In other words, AVO inversion based on the conventional equation can only be used to estimate the elastic property, which cannot obtain fracture parameters.

In one or more embodiments of the present disclosure, the described functions can be implemented by hardware, software, firmware or any other combination. If the functions are implemented by software, the functions can be stored and transferred as one or more commands or codes in a computer readable media. Said computer readable media may include a computer readable storage media (which corresponds to a visible media like data storage media) and a communication media. Said communication media may include any media that promotes to transfer computer program from one place to another based on a communication protocol. In this way, said computer readable media may generally correspond to (1) a visible computer readable storing media that is not temporal, (2) a communication media like a signal or a carrier wave. A data storage media may be any available media that is used to implement the technology described by the present disclosure, and can be accessed by one or more computers or CPUs to retrieve commands, codes and/or data structures. For example, the computer readable media may include but is unlimited within RAM, ROM, EEPROM, CD-ROM, or other optical-disk-storage media, magnetic-disk-storage media or magnetic storage media, or flash memory, or other media for storing program codes in form of instructions or data structure which can be accessed by a computer. Also, any appropriate connection can be called as a computer readable media. For example, if coaxial-cable, fiber-optic cable, twisted-pair, DSL or wireless technology like infrared ray, radio and/or micro-wave are used to transfer software from web site, servers or any other remote source, these medias are also called as computer-readable medias. It is appreciated that a computer readable storing media and a data storing media means a media that is not instantaneous, other than instantaneous media like connection, carrier wave, signal or others. As used in the present disclosure, a magnetic disk or an optical disk includes a compact disc (CD), a laser disc, an optical disk, a digital video disk, a floppy disk and a blue ray disk. Said magnetic disk usually magnetically reproduces data, but said optical disk usually optically reproduces data. Any combination of the above items should also be included in the scope of said computer readable media.

The codes can be executed by one or more processors. For example, the codes may be executed using one or more digital signal processors (DSP), special-purpose microprocessors, application-specific integrated circuits (ASIC), field programmable gate arrays (FPGA) or other equivalent integrated or discrete logical circuits. Therefore, the term 'processor' used in the present disclosure can refer to any one of structures mentioned above or any other structure that is suitable to implement the technology mentioned in the present disclosure. Furthermore, in some aspects, the functions described in the present disclosure can be implemented in specialized hardware modules and/or software modules which are configured to execute encoding and decoding, or be combined with some coder/decoder (COMBO). Also, the technology can be completely implemented on one or more circuits or logic elements.

The technologies of the present disclosure can be widely used on several kinds of apparatuses or devices, which include a wireless-handheld equipment, an integrated circuit (IC) and an IC group (for example, chipset). The present disclosure describes various kinds of elements, modules and units to emphasize arrangements which are configured to implement the described technologies. But it is not necessary to implement this technology using different hardware unit. Instead, like mentioned above, all kinds of units can be combined with proper software and/or firmware, and is applied for a codec hardware unit or a hardware unit gather (include one or more processors described above) which are integrated together.

The technical solutions of the present disclosure are illustrated in detail in connection with detailed embodiments. The embodiments are helpful to understand the spirit of the present invention. Any deduction and/or modification made based on the embodiments also fall into the scope of the present disclosure.

The invention claimed is:

1. A fracture AVO inversion method for an exploration of a fractured medium, comprising the following steps:

step 1: acquiring seismic data from the fractured medium;

step 2: making a true-amplitude processing and a pre-stack migration processing for the seismic data, and then sorting the seismic data into a CDP gather;

step 3: obtaining a reflection coefficient $R_p(\theta)$ of the fractured medium, by an AVO inversion for the seismic data based on the following equation:

$$R_p(\theta) \approx \frac{i\omega S_T}{1 - i\omega v_x S_T} T^T(\theta) + i\omega S_N N^N(\theta) +$$

$$\left(A(\theta) + \frac{i\omega S_T}{1 - i\omega v_x S_T} A_\alpha^T(\theta) + i\omega S_N A_\alpha^N(\theta)\right) r_\alpha +$$

$$\left(B(\theta) + \frac{i\omega S_T}{1 - i\omega v_x S_T} B_\beta^T(\theta) + i\omega S_N B_\beta^N(\theta)\right) r_\beta +$$

$$\left(C(\theta) + \frac{i\omega S_T}{1 - i\omega v_x S_T} C_\rho^T(\theta) + i\omega S_N C_\rho^N(\theta)\right) r_\rho,$$

where $$T^T(\theta) = 2\frac{1}{\rho}\mu^2 q_x P^2,\ N^N(\theta) = \frac{1}{2}\rho\alpha\sec\theta - \frac{2\mu}{q_\alpha}P^2,\ A(\theta) = \frac{1}{2\cos^2\theta},$$

$$A_\alpha^T(\theta) = \frac{\mu}{q_\beta}P^2 - \frac{1}{4}\rho\beta\sec\vartheta\sec\theta^2,\ A_\alpha^N(\theta) = -(\mu^2 \frac{q_\beta}{\rho}(1+\sin\theta^2)P^2,$$

$$B(\theta) = -4\left(\frac{\beta}{\alpha}\right)^2 \sin^2\theta,\ B_\beta^T(\theta) = 2\frac{\mu}{q_\beta}P^2,\ B_\beta^N(\theta) = 4\mu^2 \frac{q_\beta}{\rho}P^2,$$

$$C(\theta) = \frac{1}{2}\left(1 - 4\left(\frac{\beta}{\alpha}\right)^2 \sin^2\theta\right),\ C_\rho^T(\theta) = \frac{\mu}{q_\beta}P^2 - \frac{1}{4}\rho\beta\sec\vartheta,$$

$$C_\rho^N(\theta) = 2\mu^2 \frac{q_\beta}{\rho}P^2,$$

where $$\theta = \frac{\theta_1 + \theta_2}{2},\ \vartheta = \frac{\vartheta_1 + \vartheta_2}{2},\ \alpha = \frac{\alpha_1 + \alpha_2}{2},\ \beta = \frac{\beta_1 + \beta_2}{2},$$

$$\rho = \frac{\rho_1 + \rho_2}{2},$$

$$\Delta\alpha = \alpha_2 - \alpha_1,\ \Delta\beta = \beta_2 - \beta_1,\ \Delta\rho = \rho_2 - \rho_1,$$

$$r_\alpha = \frac{\Delta\alpha}{\alpha},\ r_\beta = \frac{\Delta\beta}{\beta},\ r_\rho = \frac{\Delta\rho}{\rho},$$

$$q_{\alpha_{1,2}} = \frac{\cos\theta_{1,2}}{\alpha_{1,2}},\ q_\alpha = \frac{q_{\alpha1} + q_{\alpha2}}{2},$$

$$q_{\beta_{1,2}} = \frac{\cos\vartheta_{1,2}}{\beta_{1,2}},\ q_\beta = \frac{q_{\beta1} + q_{\beta2}}{2},$$

$$\mu = \rho\beta^2,$$

where $v_x$ is a fluid viscosity in a fracture, $S_T$ and $S_N$ are a shear compliance and a normal compliance of the fracture respectively, $\theta_1$ and $\theta_2$ are an incident angle and a transmission angle respectively, $\vartheta_1$ and $\vartheta_2$ are a converted wave reflection angle and a converted wave transmission angle respectively, $\alpha_{1,2}$, $\beta_{1,2}$ and $\rho_{1,2}$ are a P-wave velocity, a S-wave velocity and a density for indicating rock properties, wherein subscripts 1 and 2 denote an upper media and a lower media respectively, $r_\alpha$, $r_\beta$ and $r_\rho$ are a reflectivity of the P-wave velocity, a reflectivity of the S-wave velocity and a reflectivity of the density respectively, $\omega$ is a frequency, and p is a ray parameter;

step 4: inputting $V_p$, $V_s$, $\rho$ $S_T$, $S_N$ and $v_x$ as an initial model; and modifying the initial model according to rock physical parameters; wherein the reflection coefficients generated by the fractured medium are removed from the initial model;

step 5: determining whether an error precision meets precision requirements or not; if the error precision meets the precision requirements, outputting physical parameters of the fractured medium; if the error precision does not meet the precision requirements, perform step 3.

2. The fracture AVO inversion method of claim 1, wherein, when $v_x \neq 0$, a result of the AVO inversion is rock properties of a viscous material-infilled fractured medium; but when $v_x = 0$, the result of the AVO inversion is rock properties of a dry fractured medium.

3. The fracture AVO inversion method of claim 1, wherein, when $r_\alpha = r_\beta = r_\rho = 0$, an equation $$R_p(\theta) \approx \left(\frac{i\omega S_T}{1 - i\omega v_x S_T} T^T(\theta) + i\omega S_N N^N(\theta)\right)$$

is deduced, so that the AVO inversion is made by means of this equation to obtain rock physical parameters of the fracture in a reservoir of a host media without impedance contrast.

4. The fracture AVO inversion method of claim 1, wherein, when $S_T = S_N = 0$, an equation $R_p(\theta) \approx A(\theta) r_\alpha + B(\theta) r_\beta + C(\theta) r_\rho$ is deduced, so that the AVO inversion is made by means of this equation to obtain rock physical parameters in a reservoir of a host media with impedance contrast but without any fracture.

5. A fracture AVO inversion apparatus for a fractured medium, comprising one or more processors, wherein the one or more processors are configured for implementing the following modules stored in a storage media:

a data acquisition module, for acquiring seismic data from the fractured medium;

an inversion processing module, for obtaining a reflection coefficient $R_p(\theta)$ of the fractured medium, by an AVO inversion for the seismic data based on the following equation:

$$R_p(\theta) \approx \frac{i\omega S_T}{1 - i\omega v_x S_T} T^T(\theta) + i\omega S_N N^N(\theta) +$$

$$\left(A(\theta) + \frac{i\omega S_T}{1 - i\omega v_x S_T} A_\alpha^T(\theta) + i\omega S_N A_\alpha^N(\theta)\right) r_\alpha +$$

$$\left(B(\theta) + \frac{i\omega S_T}{1 - i\omega v_x S_T} B_\beta^T(\theta) + i\omega S_N B_\beta^N(\theta)\right) r_\beta +$$

$$\left(C(\theta) + \frac{i\omega S_T}{1 - i\omega v_x S_T} C_\rho^T(\theta) + i\omega S_N C_\rho^N(\theta)\right) r_\rho,$$

where $$T^T(\theta) = 2\frac{1}{\rho}\mu^2 q_x P^2,\ N^N(\theta) = \frac{1}{2}\rho\alpha\sec\theta - \frac{2\mu}{q_\alpha}P^2,\ A(\theta) = \frac{1}{2\cos^2\theta},$$

$$A_\alpha^T(\theta) = \frac{\mu}{q_\beta}P^2 - \frac{1}{4}\rho\beta\sec\vartheta\sec\theta^2,\ A_\alpha^N(\theta) = -(\mu^2 \frac{q_\beta}{\rho}(1+\sin\theta^2)P^2,$$

$$B(\theta) = -4\left(\frac{\beta}{\alpha}\right)^2 \sin^2\theta,\ B_\beta^T(\theta) = 2\frac{\mu}{q_\beta}P^2,\ B_\beta^N(\theta) = 4\mu^2 \frac{q_\beta}{\rho}P^2,$$

$$C(\theta) = \frac{1}{2}\left(1 - 4\left(\frac{\beta}{\alpha}\right)^2 \sin^2\theta\right),\ C_\rho^T(\theta) = \frac{\mu}{q_\beta}P^2 - \frac{1}{4}\rho\beta\sec\vartheta,$$

$$C_\rho^N(\theta) = 2\mu^2 \frac{q_\beta}{\rho}P^2,$$

where $$\theta = \frac{\theta_1 + \theta_2}{2},\ \vartheta = \frac{\vartheta_1 + \vartheta_2}{2},\ \alpha = \frac{\alpha_1 + \alpha_2}{2},\ \beta = \frac{\beta_1 + \beta_2}{2},$$

$$\rho = \frac{\rho_1 + \rho_2}{2},$$

$$\Delta\alpha = \alpha_2 - \alpha_1,\ \Delta\beta = \beta_2 - \beta_1,\ \Delta\rho = \rho_2 - \rho_1,$$

$$r_\alpha = \frac{\Delta\alpha}{\alpha},\ r_\beta = \frac{\Delta\beta}{\beta},\ r_\rho = \frac{\Delta\rho}{\rho},$$

-continued $$q_{\alpha_{1,2}} = \frac{\cos\theta_{1,2}}{\alpha_{1,2}}, q_\alpha = \frac{q_{\alpha 1} + q_{\alpha 2}}{2},$$

$$q_{\beta_{1,2}} = \frac{\cos\vartheta_{1,2}}{\beta_{1,2}}, q_\beta = \frac{q_{\beta 1} + q_{\beta 2}}{2},$$

$$\mu = \rho\beta^2,$$

where $v_x$ is a fluid viscosity in a fracture respectively, $S_T$ and $S_N$ are a shear compliance and a normal compliance of the fracture respectively, $\theta_1$ and $\theta_2$ are an incident angle and a transmission angle respectively, $\vartheta_1$ and $\vartheta_2$ are a converted wave reflection angle and a converted wave transmission angle respectively, $\alpha_{1,2}$, $\beta_{1,2}$ and $\rho_{1,2}$ are a P-wave velocity, a S-wave velocity and a density for indicating rock properties, wherein subscripts 1 and 2 denote an upper media and a lower media respectively, $r_\alpha$, $r_\beta$ and $r_\rho$ are a reflectivity of the P-wave velocity, a reflectivity of the S-wave velocity and a reflectivity of the density respectively, $\omega$ is a frequency, p is a ray parameter;

a modifying module, for inputting $V_p$, $V_s$, $\rho$ $S_T$, $S_N$ and $v_x$ as an initial model; and modifying the initial model according to rock physical parameters; wherein the reflection coefficients generated by the fractured medium are removed from the initial model;

a determining module, for determining whether an error precision meets precision requirements or not if the error precision meets the precision requirements, outputting physical parameters of the fractured medium; if the error precision does not meet the precision requirements, perform step 3.

6. The fracture AVO inversion apparatus for a fractured medium of claim 5, wherein, when $v_x \ne 0$, a result of the AVO inversion is rock properties of a viscous material-infilled fractured medium; but when $v_x \ne 0$, the result of the AVO inversion is rock properties of a dry fractured medium.

7. The fracture AVO inversion apparatus for a fractured medium of claim 5, wherein, when $r_\alpha = r_\beta = r_\rho = 0$, an equation $$R_p(\theta) \approx \left(\frac{i\omega S_T}{1 - i\omega v_x S_T} T^T(\theta) + i\omega S_N N^N(\theta)\right)$$

is deduced, so that the AVO inversion is made by means of this equation to obtain rock physical parameters of the fracture in a reservoir of a host media without impedance contrast.

8. The fracture AVO inversion apparatus for a fractured medium of claim 5, wherein, when $S_T = S_N = 0$, an equation $R_p(\theta) \approx A(\theta)r_\alpha + B(\theta)r_\beta + C(\theta)r_\rho$ is deduced, so that the AVO inversion is made by means of this equation to obtain rock physical parameters in a reservoir of a host media with impedance contrast but without any fracture.

9. A fracture AVO inversion device for a fractured medium, comprising one or more processors, wherein the one or more processors are configured for implementing the following modules stored in a storage media:

a data acquisition module, for acquiring seismic data from the fractured medium;

a data preprocessing module, for making a true-amplitude processing and a pre-stack migration processing for the seismic data, and then sorting the seismic data into a CDP gather;

an inversion processing software module for obtaining a reflection coefficient $R_p(\theta)$ of the fractured medium, by an AVO inversion for the seismic data based on the following equation:

$$R_p(\theta) \approx \frac{i\omega S_T}{1 - i\omega v_x S_T} T^T(\theta) + i\omega S_N N^N(\theta) +$$
$$\left(A(\theta) + \frac{i\omega S_T}{1 - i\omega v_x S_T} A_\alpha^T(\theta) + i\omega S_N A_\alpha^N(\theta)\right) r_\alpha +$$
$$\left(B(\theta) + \frac{i\omega S_T}{1 - i\omega v_x S_T} B_\beta^T(\theta) + i\omega S_N B_\beta^N(\theta)\right) r_\beta +$$
$$\left(C(\theta) + \frac{i\omega S_T}{1 - i\omega v_x S_T} C_\rho^T(\theta) + i\omega S_N C_\rho^N(\theta)\right) r_\rho,$$

where $$T^T(\theta) = 2\frac{1}{\rho}\mu^2 q_x P^2, N^N(\theta) = \frac{1}{2}\rho\alpha\sec\theta - \frac{2\mu}{q_\alpha} P^2, A(\theta) = \frac{1}{2\cos^2\theta},$$

$$A_\alpha^T(\theta) = \frac{\mu}{q_\beta} P^2 - \frac{1}{4}\rho\beta\sec\vartheta\sec\theta^2, A_\alpha^N(\theta) = -\left(\mu^2 \frac{q_\beta}{\rho}(1 + \sin\theta^2)\right) P^2,$$

$$B(\theta) = -4\left(\frac{\beta}{\alpha}\right)^2 \sin^2\theta, B_\beta^T(\theta) = 2\frac{\mu}{q_\beta} P^2, B_\beta^N(\theta) = 4\mu^2 \frac{q_\beta}{\rho} P^2,$$

$$C(\theta) = \frac{1}{2}\left(1 - 4\left(\frac{\beta}{\alpha}\right)^2 \sin^2\theta\right), C_\rho^T(\theta) = \frac{\mu}{q_\beta} P^2 - \frac{1}{4}\rho\beta\sec\vartheta,$$

$$C_\rho^N(\theta) = 2\mu^2 \frac{q_\beta}{\rho} P^2,$$

where $$\theta = \frac{\theta_1 + \theta_2}{2}, \vartheta = \frac{\vartheta_1 + \vartheta_2}{2}, \alpha = \frac{\alpha_1 + \alpha_2}{2}, \beta = \frac{\beta_1 + \beta_2}{2},$$

$$\rho = \frac{\rho_1 + \rho_2}{2},$$

$$\Delta\alpha = \alpha_2 - \alpha_1, \Delta\beta = \beta_2 - \beta_1, \Delta\rho = \rho_2 - \rho_1,$$

$$r_\alpha = \frac{\Delta\alpha}{\alpha}, r_\beta = \frac{\Delta\beta}{\beta}, r_\rho = \frac{\Delta\rho}{\rho},$$

$$q_{\alpha_{1,2}} = \frac{\cos\theta_{1,2}}{\alpha_{1,2}}, q_\alpha = \frac{q_{\alpha 1} + q_{\alpha 2}}{2},$$

$$q_{\beta_{1,2}} = \frac{\cos\vartheta_{1,2}}{\beta_{1,2}}, q_\beta = \frac{q_{\beta 1} + q_{\beta 2}}{2},$$

$$\mu = \rho\beta^2,$$

where $v_x$ is a fluid viscosity in a fracture respectively, $S_T$ and $S_N$ are a shear compliance and a normal compliance of the fracture respectively, $\theta_1$ and $\theta_2$ are an incident angle and a transmission angle respectively, $\vartheta_1$ and $\vartheta_2$ are a converted wave reflection angle and a converted wave transmission angle respectively, $\alpha_{1,2}$, $\beta_{1,2}$ and $\rho_{1,2}$ are a P-wave velocity, a S-wave velocity and a density for indicating rock properties, wherein subscripts 1 and 2 denote an upper media and a lower media respectively, $r_\alpha$, $r_\beta$ and $r_\rho$ are a reflectivity of the P-wave velocity, a reflectivity of the S-wave velocity and a reflectivity of the density respectively, $\omega$ is a frequency, and p is a ray parameter;

a modifying module, for inputting $V_p$, $V_s$, $\rho$ $S_T$, $S_N$ and $v_x$ as an initial model;

and modifying the initial model according to rock physical parameters; wherein the reflection coefficients generated by the fractured medium are removed from the initial model;

a determining module, for determining whether an error precision meets precision requirements or not if the error precision meets the precision requirements, outputting physical parameters of the fractured medium; if the error precision does not meet the precision requirements, perform step 3.

10. The fracture AVO inversion device for a fractured medium of claim 9, wherein, when $v_x \neq 0$, a result of the AVO inversion is rock properties of a viscous material-infilled fractured medium; but when $v_x = 0$, the result of the AVO inversion is rock properties of a dry fractured medium.

11. The fracture AVO inversion device for a fractured medium of claim 9, wherein, when $r_\alpha = r_\beta = r_\rho = 0$, an equation $$R_p(\theta) \approx \left( \frac{i\omega S_T}{1 - i\omega v_x S_T} T^T(\theta) + i\omega S_N N^N(\theta) \right)$$

is deduced, so that the AVO inversion is made by means of this equation to obtain rock physical parameters of the fracture in a reservoir of a host media without impedance contrast.

12. The fracture AVO inversion device for a fractured medium of claim 9, wherein, when $S_T = S_N = 0$, an equation $R_p(\theta) \approx A(\theta) r_\alpha + B(\theta) r_\beta + C(\theta) r_\rho$ is deduced, so that the AVO inversion is made by means of this equation to obtain rock physical parameters in a reservoir of a host media with impedance contrast but without any fracture.

* * * * *